UNITED STATES PATENT OFFICE.

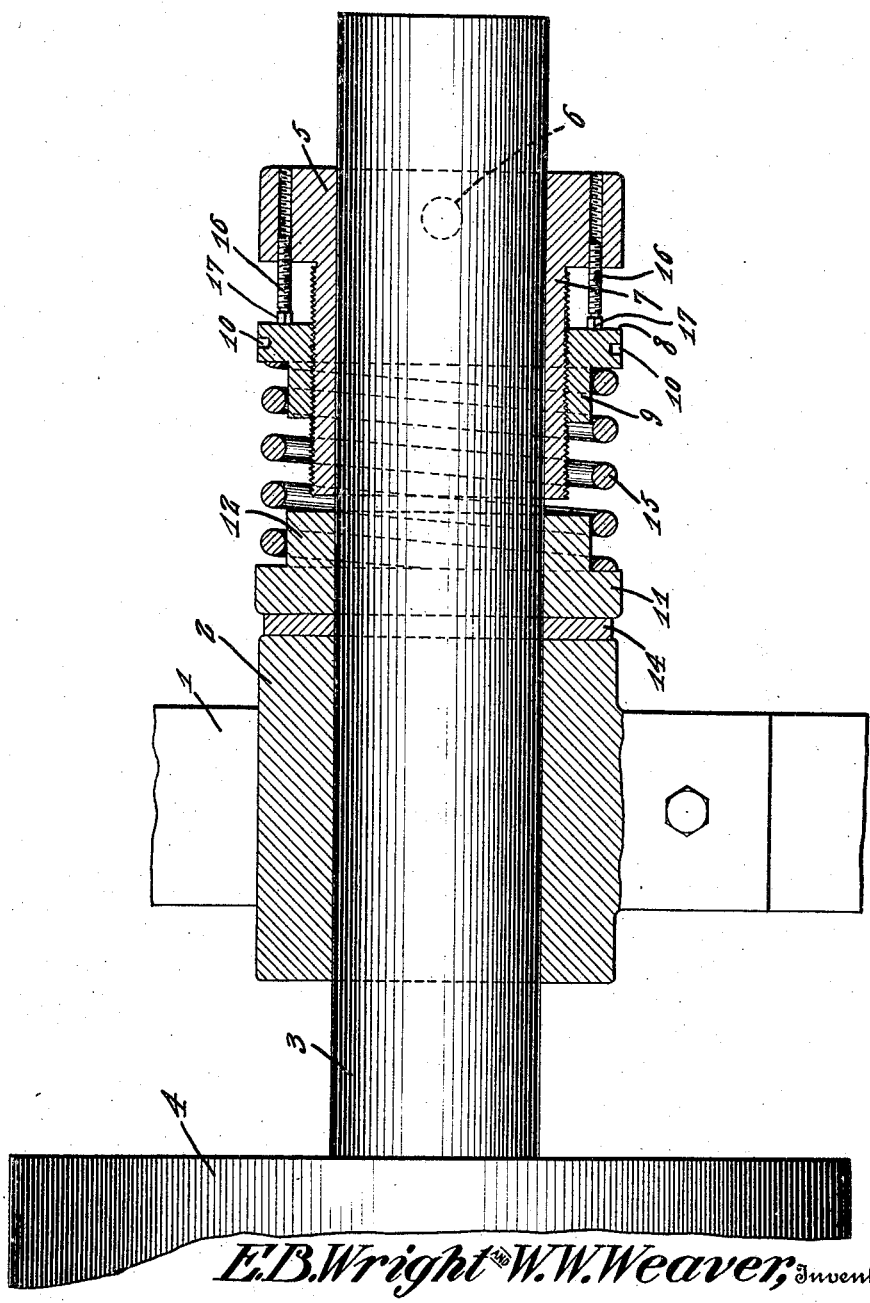

EDWARD B. WRIGHT AND WILLIAM W. WEAVER, OF FITCHBURG, MASSACHUSETTS.

PAPER MACHINE.

1,419,002. Specification of Letters Patent. Patented June 6, 1922.

Application filed December 11, 1920. Serial No. 429,943.

*To all whom it may concern:*

Be it known that we, EDWARD B. WRIGHT and WILLIAM W. WEAVER, citizens of the United States, residing at Fitchburg, in the county of Worcester, State of Massachusetts, have invented a new and useful Paper Machine, of which the following is a specification.

By way of explanation, it may be stated that the wire and breast rolls of paper making machines are subjected to severe end thrust, caused by the shake of the fourdrinier. At present, this thrust is taken care of by means of a solid collar on each side of the bearing of the roll shaft, the collar being set up tightly against the bearing box and being fastened to the shaft with set screws. The end thrust against the solid collars causes them to bring up "dead" against the ends of the bearing box, the result being a rapid deterioration of the box. As soon as the box begins to deteriorate, under the hammer produced by the endwise movement of the roll, the collars are slid on the shaft, or else the box is pounded to such an extent that a new one has to be substituted.

The foregoing being true, it is one object of this invention to provide novel means whereby the wire roll or the breast roll of a paper machine may be cushioned and held yieldably against endwise movement. A further object of the invention is to provide a novel form of end thrust bearing in a device of the kind mentioned.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings a single sectional view discloses a device constructed in accordance with the invention, parts appearing in elevation.

The numeral 1 marks a portion of the frame of a paper machine, the frame having a bearing 2 in which the shaft 3 of a roll 4 is journaled, the roll being either the wire roll or the breast roll. A collar 5 is secured at 6 to the shaft 3 in spaced relation to the bearing 2 and includes a tubular body 7 projecting toward the bearing. A nut 8 is provided, the same having a neck 9, the nut and its neck being threaded on the body 7 of the collar 5. In order to facilitate the rotation of the nut 8, the nut may be provided in its periphery with seats 10 adapted to receive the lugs of a spanner wrench (not shown). A collar 11 surrounds the shaft 3 adjacent to the bearing 2, a washer 14 being inserted between the collar and the bearing. The collar 11 includes a neck 12 surrounding the shaft 3. A compression spring 15 surrounds the neck 9 of the nut 7 and surrounds the neck 12 of the collar 11, the spring abutting at its ends against the nut 8 and against the collar 11. Screws 16 are threaded into the collar 5 and extend longitudinally of the body 7, the screws 16 being supplied at their inner ends, with heads 17, bearing against the nut 8.

In practical operation, the nut 8 may be rotated, and when the nut is rotated, the spring 15 will be put under compression, since the nut is threaded on the body 7 of the collar 5. The screws 16 may be advanced against the nut 8 to hold the nut against rotation.

It is clear that when a device, constructed as above described, is mounted on the shaft 3, the end thrust of the shaft will be received yieldingly, and it will be practically impossible for the shaft to move endwise, the disadvantages pointed out in the opening portion of this specification being avoided.

Having thus described the invention, what is claimed is:—

1. In a device of the class described, a bearing; a shaft journaled in the bearing; a collar on the shaft and exerting a thrust against the bearing, the collar having a neck; a second collar on the shaft and including a tubular body projecting toward the neck; a nut threaded on the body of the collar and comprising a neck; and a helical spring surrounding the necks of the collar and the nut, and abutting against the collar and the nut.

2. A device of the class described, constructed as set forth in claim 1, and further characterized by the provision of adjustable means on the said second collar and coacting with the nut to limit the rotation of the nut.

In testimony that we claim the foregoing as our own, we have hereto affixed our signatures in the presence of two witnesses.

EDWARD B. WRIGHT.
WILLIAM W. WEAVER.

Witnesses:
MERTON W. DEMONT,
THOMAS T. ROGAN.